US009825893B2

(12) United States Patent
Barbulescu et al.

(10) Patent No.: US 9,825,893 B2
(45) Date of Patent: *Nov. 21, 2017

(54) SYSTEM AND METHOD FOR BROADCASTING AUDIO TWEETS

(71) Applicant: AudioNow IP Holdings, LLC, Wilmington, DE (US)

(72) Inventors: Marcel Barbulescu, Falls Church, VA (US); Elan Joel Blutinger, Washington, DC (US)

(73) Assignee: AUDIONOW IP HOLDINGS, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,107

(22) Filed: Jan. 13, 2017

(65) Prior Publication Data

US 2017/0126600 A1    May 4, 2017

Related U.S. Application Data

(63) Continuation of application No. 13/763,114, filed on Feb. 8, 2013, now Pat. No. 9,549,295.

(51) Int. Cl.
| | |
|---|---|
| *H04M 3/42* | (2006.01) |
| *H04L 12/58* | (2006.01) |
| *H04W 4/12* | (2009.01) |
| *G10L 15/26* | (2006.01) |
| *H04W 4/02* | (2009.01) |
| *H04W 4/20* | (2009.01) |

(52) U.S. Cl.
CPC .............. *H04L 51/10* (2013.01); *H04L 51/38* (2013.01); *H04W 4/12* (2013.01); *G10L 15/26* (2013.01); *H04W 4/02* (2013.01); *H04W 4/206* (2013.01)

(58) Field of Classification Search
CPC . H04M 2203/655; H04M 3/567; H04W 4/12; H04W 4/06; H04W 4/206
USPC .......................................... 455/414.1–414.4
See application file for complete search history.

(56) References Cited

U.S. PATENT DOCUMENTS

| | | |
|---|---|---|
| 2009/0019374 A1 | 1/2009 | Logan et al. |
| 2011/0058101 A1 | 3/2011 | Earley et al. |
| 2012/0265575 A1 | 10/2012 | Torii et al. |
| 2014/0068432 A1 | 3/2014 | Kucharz et al. |

*Primary Examiner* — Charles Appiah
*Assistant Examiner* — Jaime Holliday

(57) ABSTRACT

Disclosed herein are systems, methods, and non-transitory computer-readable storage media for broadcasting audio tweets. A system broadcasting audio tweets receives tweets via telephone devices, wherein each listener hears a telephone call of a broadcast on the telephone devices. Each received tweet is associated with one or more tags specifying tweet content, which is used to analyze received tweets. The system presents a display of analyzed tweets for selection to a host. The host selects one or more tweets and broadcasts the selected tweets as part of the broadcast to the telephone devices. Automatic speech recognition can be used to automatically convert received audio tweets to text to enable tagging and analyzing the tweets.

20 Claims, 5 Drawing Sheets

FIG. 3

| ASR | BROADCAST | LISTNER | TAGS | TIME | TWEET |
|---|---|---|---|---|---|
| 🎤 | 📡 | jmcorne | <TRAFFIC><BELTWAY> | 5:45PM | SITTING HERE ...... |
| 🎤 | 📡 | ljande | <TRAFFIC> | 5:43PM | FLYING BY ......... |
| 🎤 | 📡 | smorn | <TRAFFIC><INTERSTATE> | 5:40PM | FRAMER LOST .... |
| 🎤 | 📡 | qjclan | <WHEATHER> | 5:15PM | RAINING ............. |
| 🎤 | 📡 | cjdugr | <DEBATE><REPUB> | 4:39PM | NO WAY ............ |

302 — ASR
304 — BROADCAST
306 — LISTNER
308 — TAGS
310 — TIME
312 — TWEET

FIG. 4

| 402 USERNAME | 404 NAME | 406 BROADCASTER RATING | 408 TWEET TAGS | 410 TWEET |
|---|---|---|---|---|
| jmcorne | JAMES CORNELL | ★★★☆☆ | <TRAFFIC><WHEATHER> | ⇅ |
| ljande | LORI ANDERS | ★★★☆☆ | <RELIGION><WHEATHER> | ⇅ |
| smorn | SAM MORNIST | ★★★☆☆ | <SPORTS><RAVENS> | ⇅ |
| ajclan | ADAM CLANOFF | ★★★☆☆ | <SPORTS><BASEBALL> | ⇅ |
| cjdugr | CHRIS DUGREN | ★☆☆☆☆ | <RELIGION><POLITICS> | ⇅ |

414

412

SYSTEM AND METHOD FOR BROADCASTING AUDIO TWEETS

PRIORITY INFORMATION

The present application is a continuation of U.S. patent application Ser. No. 13/763,114, filed Feb. 8, 2013, the contents of which is incorporated herein by reference in its entirety.

BACKGROUND

1. Technical Field

The present disclosure relates to broadcasting audio tweets and more specifically to using automatic speech recognition to associate tweets with tags identifying tweet content utilized in selecting specific tweets for broadcasting to telephone devices and other digital devices.

2. Introduction

Users of telephone devices no longer use phones exclusively for making and receiving telephone calls. The development of smartphones has enabled users to perform more sophisticated tasks using their phones. Features such as the internet and an ever-expanding set of applications for smartphones allow users to accomplish a range of tasks from listening to the radio to sleep monitoring. Traditionally, users listened to the radio using a dedicated radio device located in their home or car. Now, listeners can listen to broadcasts using their smartphones in many different locations.

Often during broadcasts including commentary such as a talk show, the commentator requests listener input. Commentators perform contests involving give-aways, take polls and ask listeners for opinions on various topics. Traditionally, when a commentator requests listener feedback, a listener listening to a broadcast on a radio in a car for example, would call in from a cell phone and wait until their turn to voice their opinion on air. Call screeners would assist in the process and could record a listener's input for future playback. Issues such as unfamiliarity with a listener, feedback irrelevance and lag time exist with the traditional method of listeners responding to commentator requests for listener input.

What is needed in the art is an improved method for a listener to provide input to a broadcast program.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for broadcasting audio tweets. A broadcaster broadcasting a program can request commentary from listeners on a particular topic, at which point listeners can respond via tweeting comments to the broadcaster for inclusion in the broadcast. A tweet is text-based commentary having a size of up to 140 characters in length. A system implementing broadcasting audio tweets can receive tweets via telephone devices or other digital devices that listeners use to hear telephone calls of broadcasts. Other communication mechanisms outside of a telephone call can also apply. The system can associate each received tweet with one or more tags that specify tweet content. For example, for political tweets tags such as democrat and republican can be used to identify the content of a tweet, or for sports related tweets tags such as espn can be associated with tweets. Tags can be based on listener location, listener profile, broadcast program and time, for instance. The tags can be used to analyze received tweets and perform tasks such as searching and sorting tweets, and performing statistical analysis. Once the tweets are tagged, the system can present a display of one or more analyzed tweets that are selectable by a host. The display can include a listener profile, a tweet and metadata relating to the tweet. A listener profile can include information pertaining to the listener such as ratings given to the listener by a commentator, a tweet history that includes number and frequency of tweets, listener ratings and listener preferences. Metadata relating to the tweet can include information such as time tweet was received, length of audio and listener name. Icons associated with displayed tweets that when clicked can cause the system to perform automatic speech recognition and display a text associated with the tweet, and optionally can insert the tweet into the broadcast. The tweet can be received by listeners listening to the broadcast on their phones.

This improved approach allows for listeners to respond to a broadcaster in such a way that a host (i.e. broadcaster) can view received tweets, view tweet content using automatic speech recognition, organize tweets and insert tweets into a broadcast. In one embodiment, a listener can mute a telephone call of the broadcast on a telephone device using a hands-free approach while recording a tweet for inclusion in the broadcast.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an exemplary tweet interface system embodiment;

FIG. 4 illustrates an exemplary user interface system embodiment; and

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for broadcasting audio tweets. A system, method and non-transitory computer-readable media are disclosed which broadcast audio tweets received from listeners listening to a telephone call of a broadcast, after filtering is performed by a host. The call may also include a digital or packet based communication as opposed to a traditional telephone call. Thus, a "telephone device" disclosed herein can be a device that communicates audio either via a telephone call, or a data-based communication of audio such as over Voice Over IP, or another mechanisms of using packets or digital data to communicate an audio signal. A brief introductory description of a basic general purpose system or computing device in FIG. 1 which can be employed to practice the concepts is disclosed herein. A more detailed description of broadcasting audio tweets will then follow.

A listener having a telephone device listening to a broadcast can respond to a request for tweets by a broadcaster via their telephone device. Tweets can be associated with tags relating to tweet content, and tweets can be analyzed according to tags applied to each tweet. A display of tweets can be presented such that tweets are selectable by a host; a host can select a tweet for automatic speech recognition or can select a tweet for inclusion in the broadcast. A tweet selected for broadcast is inserted into the broadcast and relayed to listeners.

These variations shall be discussed herein as the various embodiments are set forth. The disclosure now turns to FIG. 1.

Figure 1:
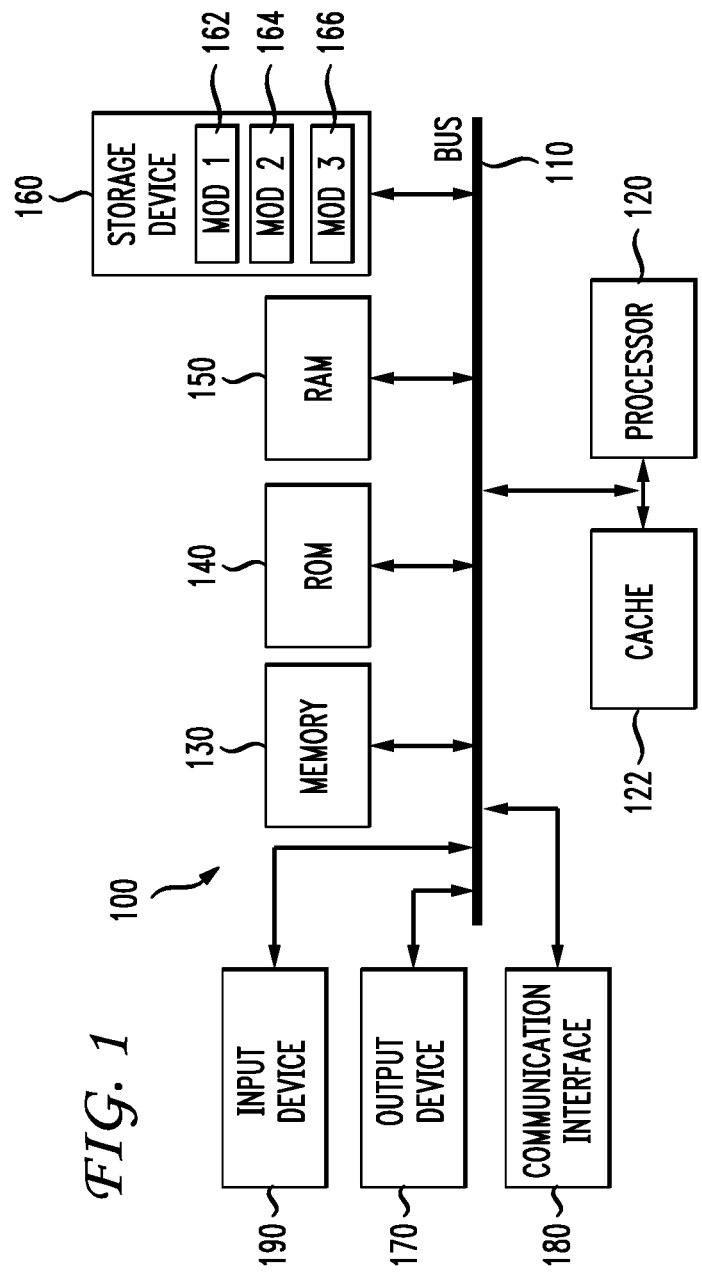
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
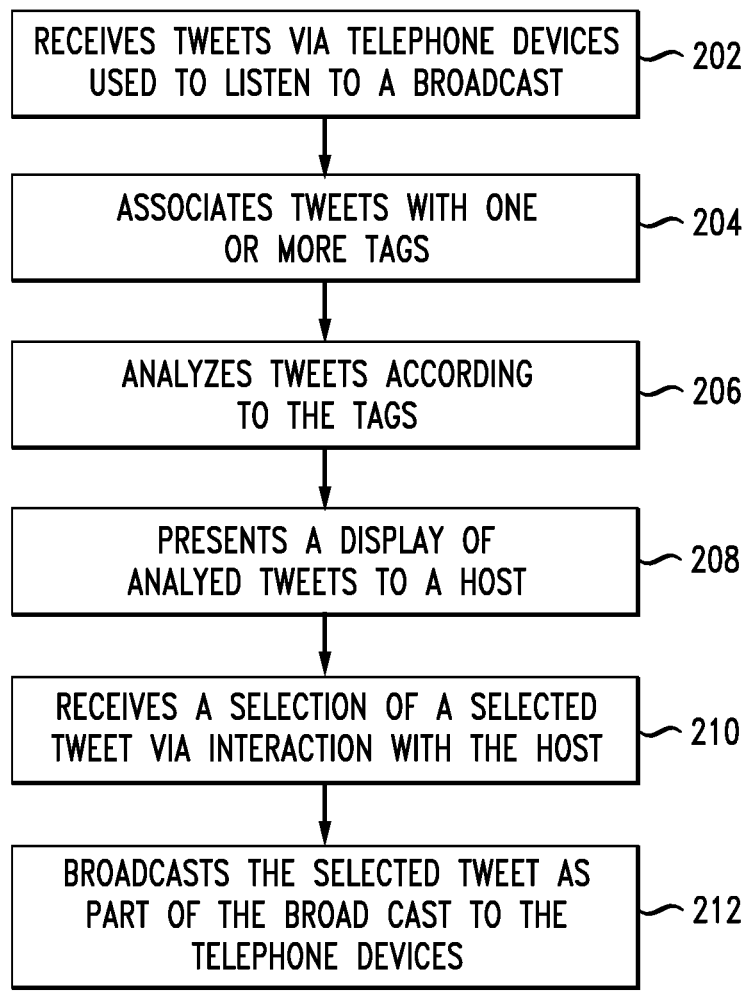
FIG. 2 illustrates a broadcasting audio tweets method embodiment.

Having disclosed some basic system components and concepts, the disclosure now turns to the exemplary method embodiment shown in FIG. 2. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

Broadcasting audio tweets can be beneficial to a listener because it allows for the listener to send in their opinion without being placed on hold and waiting until their turn to speak on air. Listeners can simply tweet their opinion to the broadcaster and not wait on the phone. Traditionally, a call screener or the broadcaster would give callers a number in a queue and callers would wait until their turn came up to speak their opinion on air or to speak and have their opinion recorded and replayed at a later time. In addition to benefitting users, broadcasting audio tweets can be beneficial to the broadcaster because he can filter responses from listeners more effectively and efficiently, allowing for an improved broadcast.

A system broadcasting audio tweets first receives tweets via telephone devices (or other digital or data communication devices) used for telephone calls between a broadcaster and the devices (202). Tweets are short messages and users can send and receive text-based messages up to 140 characters in length. The short length allows tweets to be compatible with SMS messaging and has introduced shorthand slang used in SMS messages. Users can group their messages together using hashtags, which are phrases prefixed with a "#" sign. The "@" sign in conjunction with a username is used for replying or mentioning other users. The telephone device can be used to hear a telephone call of the broadcast. Audio tweets can be sent by listeners in response to a request by a broadcaster, using their telephone. For example, a broadcaster broadcasting a program on politics can request that listeners respond with their opinion. A question such as "Should the president be re-elected?" or any other question can be posed for listeners to respond to. One or more listeners can respond to the request by sending an audio tweet via their telephone to the broadcaster. To send an audio tweet, a user can speak the tweet into their telephone, which is then sent on to the broadcaster. When tweets are received, each tweet is associated with at least one tag (204) identifying tweet content.

Tags associated with tweets can identify tweet content such as relating to politics, sports, religion and pop culture but can also be related to the listener such as listener location, listener profile, broadcast program and time. Tags relating to politics can include <DEMOCRAT> or <REPUBLICAN>, sport tags can include <FOOTBALL> or <RAVENS FAN> for example, and a religious tag could include <CATHOLIC>. Listener location can be provided by GPS for example or a listener can audibly provide their location at the beginning of the tweet. Tags such as <WASHINGTON, D.C.> or <HOWARD COUNTY> can be associated with a listener's tweet relating to location. A listener profile or username can be associated with a tweet, such that the broadcaster has additional information on a listener rather than simply a tweet. For example, a full name such as <JOE M. SHMOE> or alias such as <HAPPY J> can be associated with a tweet indicating identity of the listener. A tag relating a tweet to a specific broadcast can be utilized in the event a broadcaster makes a request for tweets for multiple commentaries. For example, a broadcaster can ask opinions on the latest Ravens football game and ask for opinions on an unrelated topic such as a recent political debate. Tweets received can be tagged based on content, the football tweets can be tagged <RAVENS> while the political debate tweets can be tagged <DEBATE>. Tweets can be associated with one or more tags. For example, a listener responding to a request for tweets relating to the weather can receive tags such as <WEATHER>, <J SCHMOE>, <RAINING> and <4:53 PM>. Additionally, GPS can provide location based tags such as longitude and latitude <38°, −96.2°> or city and state. Associating tags can be performed manually by a human being or automatically by a computing system. A human such as a call screener can listen to a tweet and associate related tags with the tweet or a computing system can perform automatic speech recognition on a tweet and automatically apply tags to tweets. Optionally, a listener can apply tags to tweets. For instance, a listener sending an audio tweet on politics can tag their own tweet either by automatic speech recognition or by any other way. The application of tags to tweets allows for searching, sorting, organizing and analyzing tweets in an efficient manner.

Once received tweets are tagged with one or more tags, the system analyzes the tweets according to the tags associated with each tweet (206). A system can analyze tweets in many different ways, including sorting and searching. For example, a system can analyze received tweets in the past twenty minutes based on location. A broadcaster requesting information on traffic can search for tweets having the tag <MIXING BOWL> because the broadcaster wanted traffic information in the mixing bowl area of the beltway. The broadcaster can, during a broadcast on politics, sort received tweets based on political party and can choose to air a tweet based on party, or can air tweets evenly from all sides based on the sort. The broadcaster can compute statistics based on tweet tags. For example, a broadcaster could compute the number of listeners that reported rain in the mixing bowl area using the tags <RAIN> and <MIXING BOWL>. The broadcaster can compute number of listeners that reported during different time frames throughout the day, so as to tailor broadcasts at specific times to the number of listeners. Statistics based on average length of tweet, location based tweets such as the location of a listener when a tweet is sent to the broadcaster may be computed.

The system can present a display of analyzed tweets to a host (208), the tweets having selectable icons for performing different functions. An icon can be provided that when selected, causes a computing system to perform automatic speech recognition on the tweet such that a broadcaster can read a text of the tweet in addition to listening to the tweet. The broadcaster can view the tweet as it is translated from audio to text. Additionally, a broadcaster can listen to an audio version of the tweet and tag the tweet manually. An icon can be provided that when selected, causes the audio associated with the tweet to be inserted into the broadcast that is transmitted to the listeners using telephone devices or other communication devices. The system can receive a selection of a selected tweet via interaction with the host (210) and can broadcast the selected tweet as part of the broadcast (212). This approach allows a broadcaster to view tweets, select tweets for translating to text and insert into a broadcast based on numerous factors such as relevance, listener, rating, etc.

FIG. 3 illustrates an exemplary display of analyzed tweets. The system 100 can display to the broadcaster, call screener or any other person able to receive tweets a listing of received tweets. Tweets can be sorted by time, tag, listener or any other manner useful to the broadcaster in selecting tweets for inclusion in the broadcast. For example, a display can have columns for automatic speech recognition 302 and broadcast 304 buttons that are selectable by the broadcaster. The automatic speech recognition button can translate part or the entire audio tweet into text such that it is readable. Automatic speech recognition can be configured to translate manually or automatically. For example, when a tweet is received, the first few characters can be translated automatically 312 such that a preview is generated for the broadcaster. A preview can be helpful in determining whether to pursue including a specific tweet in the broadcast. In addition to selectable buttons, listener name or username 306, tags 308 and time received 310 can be included in the display. Tags associated with tweets (either manually or automatically applied) can be displayed and used to search and sort tweets. For example, when a broadcaster requests responses as to the traffic on the beltway, listeners can press a button on their phone to record a short tweet that is received by the broadcasting station. The tweets are received and tagged with <TRAFFIC>. The broadcaster can sort tweets received in the past twenty minutes, and display the most recent three tweets tagged with traffic. From the top three the broadcaster may decide to read the preview 312 or further scrutinize tweets based on secondary tags such as <BELTWAY>. Alternately, a broadcaster may decide to broadcast a tweet based on listener. For instance, if the broadcaster has a history with one or more listeners, they may select a tweet to broadcast based on the history. Listener names or user names can be selectable such that a broadcaster can select a user name and be taken to a different display that displays a user profile. The broadcaster can use the information in the profile to decide whether to air a listener's tweet.

FIG. 4 illustrates an exemplary user profile display. A user profile can include information such as username 402, given name 404, broadcaster rating 406, tags 408 and past tweets 410, for example. A broadcaster can quickly review a tweet received by rating the tweet on a one to five scale and the system can generate an overall rating based on all received tweets. This can be utilized by the broadcaster in deciding between two received tweets on the same topic. Additionally, listeners may choose to rate tweets on particular listeners and a broadcaster can use listener ratings to determine if a tweet should be aired if the broadcaster does not have time to review the tweet himself. For example, a broadcaster can choose to broadcast a tweet received by a trusted listener and tweeter with the username ajclan 412 having an overall broadcaster rating of 4 over user ljande with a not-so-favorable overall broadcaster rating of 1. In addition to broadcaster ratings, a history of tags associated with listener's tweets can be available for review by a broadcaster, user or other users/listeners. The tag history can provide valuable information as to what listeners are interested in tweeting about. For instance, if there are many listeners that tweet about the traffic a broadcaster can tailor a program at a particular time to those listeners. Or, the broadcaster may see that not many tweets relating to baseball are received and may choose to spend more time during a baseball broadcast requesting tweets or playing listener tweets to encourage more response. Also, past tweets 410 can be useful to a broadcaster, listener or other listeners in learning more about particular topics. A broadcaster can browse past tweets to insert into a broadcast during downtime or prior to a broadcast in case he is broadcasting a program when there is typically little response by listeners. Other listeners may hear a particular tweet that was inserted into a broadcast by a particular listener and may desire to hear more from that particular listener. Other listeners can perform functions such as searching and sorting. For example, user jmcorne can search user profiles for users that tweet most often about traffic. In one embodiment, when a broadcaster is receiving tweets, tweets can immediately be made available to the public such that they can listen to received tweets, view the text of tweets and rate tweets.

Figure 5:
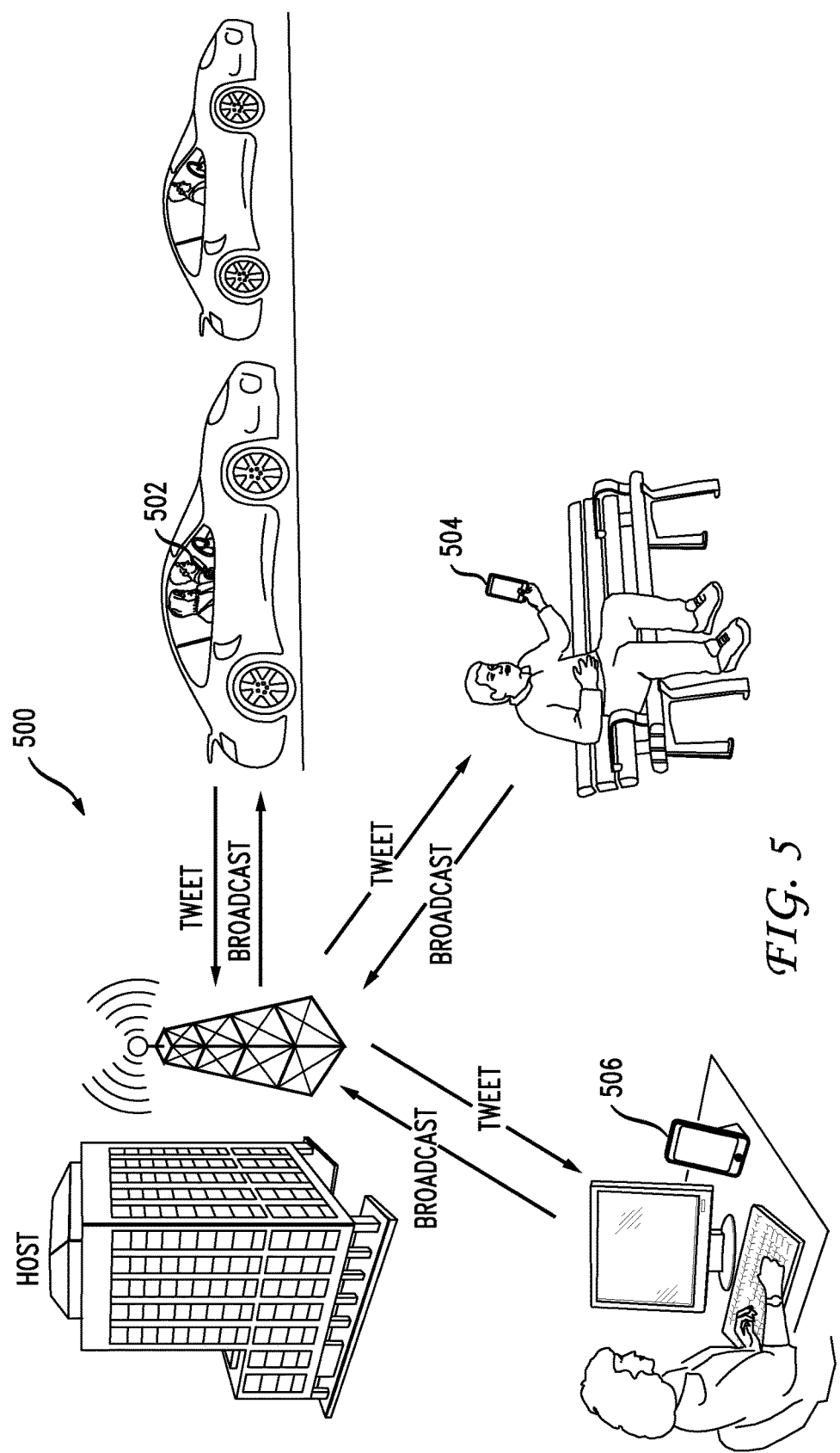
FIG. 5 illustrates an exemplary system embodiment.

FIG. 5 illustrates an exemplary system embodiment of broadcasting audio tweets. An exemplary system embodiment can include listeners listening to a broadcast in a vehicle while travelling on the road 502, while on a lunch break in the park 504 and while at work 506. In one embodiment, a listener listening to a broadcast using speakerphone via a telephone in a car can mute the broadcast during tweet recording so the audio does not interfere with recording the tweet. The mute can be performed via a button-press on the telephone or can be performed using a voice command such as "MUTE" and "UNMUTE". The ability to mute/unmute the broadcast in a hands-free manner can be useful to listeners in many different situations such as at their lunch break or while typing away at a computer. Listeners can simultaneously receive the same broadcasted program through their telephones and can respond to a request for tweets by the broadcaster.

In one embodiment, the concept of tweeting using tags can be applied to services. A user can provide a tweet with an update of a situation to a broadcaster for use in a broadcast program. For example, a user at an airport waiting for a plane can send one or more tweets via his telephone (or other data device such as an iPad, tablet, desk top or laptop computer, or any other device that utilizes Wifi or any other wireless or wired protocol that is different from what would be considered a "telephone" connection) to a broadcaster that receives tweets for services. The user can tweet a delay in a particular flight so that a broadcaster can announce the delay to other potential travelers.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any audio broadcast over the air, over the Internet, and so forth. Further, tweets are typically 140 characters or less. Audio tweets may be longer in numbers of characters but still short and concise to be considered a "tweet." For example, a 20 second traffic report could be considered an audio tweet as the term is used herein. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving a respective tweet from each of a plurality of devices;
analyzing the respective tweet based on a location of a respective device of the plurality of devices to yield a plurality of analyzed tweets; and
transmitting, for display, at least a portion of a plurality of analyzed tweets to a host device viewed by a host of a broadcast to yield displayed tweets, wherein the displayed tweets are selectable by the host, and wherein icons associated with each of the display tweets comprises a first selectable portion, which, when selected causes a processor to display a text associated with the respective tweet and a second selectable portion which causes the processor to insert audio associated with the respective tweet into the broadcast transmitted to the plurality of devices.

2. The method of claim 1, wherein the respective tweet is text composed by a listener, each respective device being used for a respective telephone call between a broadcaster and the each respective device, wherein each listener hears the respective telephone call of the broadcast from the broadcaster on the each respective device.

3. The method of claim 1, further comprising receiving a selection of the respective tweet via an interaction with the host with at least one of the displayed tweets to yield a selected tweet.

4. The method of claim 3, further comprising broadcasting the selected tweet as part of the broadcast to the plurality of devices.

5. The method of claim 1, wherein at least one tag is associated with the respective tweet and identifies tweet content.

6. The method of claim 1, wherein the respective tweet is searchable based on at least one tag associated with the respective tweet.

7. The method of claim 6, wherein the at least one tag is based on at least one of listener location, listener profile, broadcast program and time.

8. The method of claim 1, wherein a listener can mute a telephone call of the broadcast on the respective device using a hands-free approach while recording the respective tweet.

9. The method of claim 1, further comprising associating the respective tweet with at least one tag by at least one of manually and automatically associating based on tweet content.

10. The method of claim 1, wherein a display comprises at least one of a listener profile, a tweet and metadata relating to the tweet.

11. The method of claim 10, wherein a listener profile includes at least one of commentator rating, tweet history, listener rating and preferences.

12. The method of claim 10, wherein metadata relating to the tweet includes at least one of a time received, user name and tag.

13. A system comprising:
a processor; and
a memory storing instructions which, when performed by the processor, cause the processor to perform operations comprising:
receiving a respective tweet from each of a plurality of devices;
analyzing the respective tweet based on a location of a respective device of the plurality of devices to yield a plurality of analyzed tweets; and
transmitting, for display, at least a portion of a plurality of analyzed tweets to a host device viewed by a host of a broadcast to yield displayed tweets, wherein the displayed tweets are selectable by the host, and wherein icons associated with each of the display tweets comprises a first selectable portion, which, when selected causes a processor to display a text associated with the respective tweet and a second selectable portion which causes the processor to insert audio associated with the respective tweet into the broadcast transmitted to the plurality of devices.

14. The system of claim 13, wherein the respective tweet is text composed by a listener, each respective device being used for a respective telephone call between a broadcaster and the each respective device, wherein each listener hears the respective telephone call of the broadcast from the broadcaster on the each respective device.

15. The system of claim 13, wherein the memory stores additional instructions which, when performed by the processor, cause the processor to perform operations comprising:
    receiving a selection of the respective tweet via an interaction with the host with at least one of the displayed tweets to yield a selected tweet.

16. The system of claim 15, wherein the memory stores additional instructions which, when performed by the processor, cause the processor to perform operations comprising:
    broadcasting the selected tweet as part of the broadcast to the plurality of devices.

17. The system of claim 13, wherein at least one tag is associated with the respective tweet and identifies tweet content.

18. The system of claim 13, wherein the respective tweet is searchable based on at least one tag associated with the respective tweet.

19. The system of claim 18, wherein the at least one tag is based on at least one of listener location, listener profile, broadcast program and time.

20. The system of claim 13, wherein a listener can mute a telephone call of the broadcast on the respective device using a hands-free approach while recording the respective tweet.

* * * * *